US011261372B2

(12) United States Patent
Stephenson

(10) Patent No.: US 11,261,372 B2
(45) Date of Patent: Mar. 1, 2022

(54) OVERPRESSURE MITIGATION SYSTEMS FOR HYDRAULIC FRACTURING

(71) Applicant: Halliburton Energy Services, Inc., Houston, TX (US)

(72) Inventor: Stanley V. Stephenson, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/643,925

(22) PCT Filed: Dec. 12, 2017

(86) PCT No.: PCT/US2017/065772
§ 371 (c)(1),
(2) Date: Mar. 3, 2020

(87) PCT Pub. No.: WO2019/117862
PCT Pub. Date: Jun. 20, 2019

(65) Prior Publication Data
US 2020/0407625 A1    Dec. 31, 2020

(51) Int. Cl.
*C09K 8/62* (2006.01)
*C09K 8/80* (2006.01)
*E21B 47/06* (2012.01)

(52) U.S. Cl.
CPC .................. *C09K 8/62* (2013.01); *C09K 8/80* (2013.01); *E21B 47/06* (2013.01)

(58) Field of Classification Search
CPC .......... E21B 47/06; E21B 21/08; E21B 47/18; E21B 43/267; E21B 43/26
See application file for complete search history.

(56) References Cited

U.S. PATENT DOCUMENTS

| 5,536,115 | A | 7/1996 | Keck |
| 8,607,864 | B2 | 12/2013 | McLeod et al. |
| 2004/0206494 | A1 | 10/2004 | Stephenson et al. |
| 2009/0006005 | A1 | 1/2009 | Segal et al. |
| 2013/0008648 | A1 | 1/2013 | Lovorn et al. |
| 2016/0273346 | A1 | 9/2016 | Tang et al. |

OTHER PUBLICATIONS

International Search Report and Written Opinion dated Sep. 12, 2018; International PCT Application No. PCT/US2017/065772.

*Primary Examiner* — Zakiya W Bates
(74) *Attorney, Agent, or Firm* — McGuireWoods LLP

(57) ABSTRACT

A system for mitigating or preventing overpressure in a well system includes a controller and one or more sensors. The overpressure mitigation system controller obtains downhole pressure measurements using a downhole pressure sensor. A rate of change of the downhole pressure is determined based on the downhole pressure measurements, and the rate of change is compared with a rate-of-change threshold. The rate-of-change threshold is determined uniquely for each well system in real time based on a flow rate of the fluid, a volume of the fluid, a proppant concentration in the fluid, a speed of sound in the fluid, and/or other features of the fluid, the proppant, the wellbore, a casing, or other components of the well system.

20 Claims, 4 Drawing Sheets

OVERPRESSURE MITIGATION SYSTEMS FOR HYDRAULIC FRACTURING

TECHNICAL FIELD

The present description relates in general to hydraulic fracturing operations, and more particularly, for example and without limitation, to systems and methods for mitigating fluid hammer effects during pumping of fracturing fluids.

BACKGROUND OF THE DISCLOSURE

In the production of oil and gas in the field, it is often required to pump a fluid down a wellbore in a subterranean formation. In one example, fracturing fluid is pumped from the surface into the wellbore during hydraulic fracturing operations to generate, extend, and/or prop open one or more fractures in the formation.

However, challenges can arise when pumping a fluid into a wellbore, particularly when the wellbore extends long distances (e.g., miles) into the formation.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1:
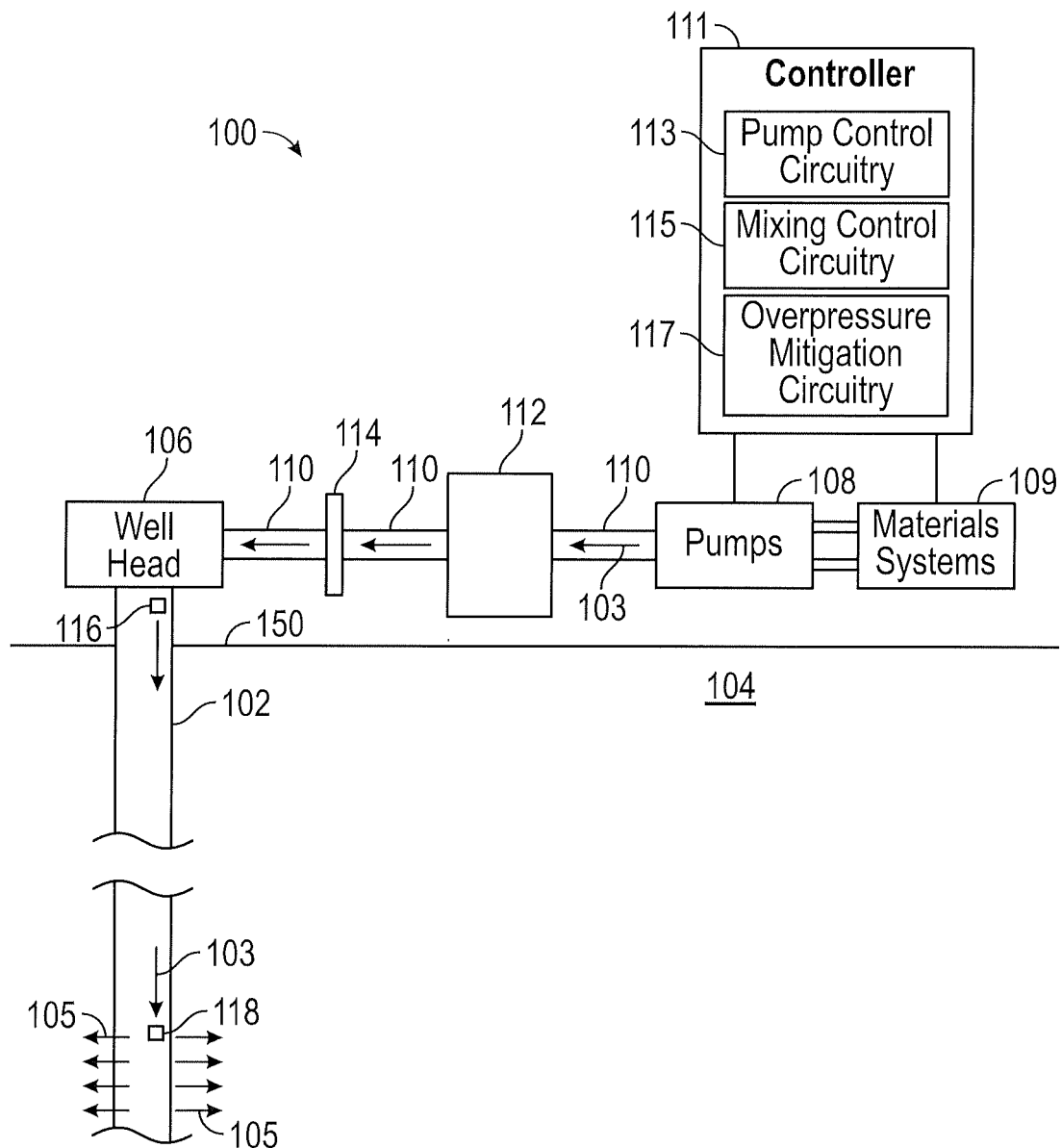
FIG. 1 is a diagram of a system having a wellbore and associated pumping equipment, according to some embodiments of the present disclosure.

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The present disclosure is related to hydraulic fracturing of subterranean hydrocarbon-producing wells and, more particularly, systems and methods for mitigating fluid hammer effects during hydraulic fracturing operations for stimulating the production of hydrocarbons.

Subterranean hydraulic fracturing (alternately referred to as "fracking") is sometimes conducted to increase or stimulate production from hydrocarbon-producing wells. In hydraulic fracturing, a fracturing fluid is pumped at an elevated pressure from a wellbore into adjacent hydrocarbon-bearing subterranean formations. The pumped fracturing fluid splits or "fractures" the rock formation along veins or planes extending laterally from the wellbore.

In some applications, the fracturing fluid contains propping agents (alternately referred to as "proppant") that are also injected into the opened fractures. Once a desired fracture network is formed, the fluid flow is reversed and the liquid portion of the fracturing fluid is removed. The proppant is intentionally left behind to prevent the fractures from closing onto themselves due to the weight and stresses within the formation. Accordingly, the proppant "props" or supports the fractures to remain open, yet remain permeable to hydrocarbon fluid flow since they form a packed bed of particles with interstitial void space connectivity.

Hydraulic fractures near the wellbore wall are ideally simple, straight, and wide to provide a direct fluid pathway between the wellbore and the deeper parts of the formation. Once farther into the formation, then it is preferable to generate a complex fracture network that maximizes reservoir contact.

In some circumstances, while pumping fluid into a wellbore, the fluid flow can become obstructed. For example, during hydraulic fracturing operations, a "screenout" (also known as a "sandout") can occur. Screenout is a condition that occurs when the fracture network at or near the wellbore wall becomes too complex or restricted and the proppant substantially plugs the fractures and thereby prevents the fracturing fluid from flowing deeper into the formation at that location.

When there is a downhole flow stoppage such as from a well screenout, a fluid hammer effect, described in further detail hereinafter, can occur in the fluid in the wellbore and/or surface fluid flow conduits. Fluid hammer effects of this type can be damaging to the wellbore, the wellhead, and/or fluid pumping or other surface equipment.

In accordance with various aspects of the subject disclosure, systems and methods are described that mitigate and/or prevent a damaging fluid hammer in the fluid. For example, a downhole pressure sensor can provide downhole pressure measurements to overpressure prevention equipment at the surface. The overpressure prevention equipment includes processing circuitry, sometimes referred to herein as overpressure mitigation circuitry, that processes the downhole pressure measurements and controls fluid pumps at the surface responsive to the downhole pressure measurements.

FIG. 1 is a schematic diagram of an example well system 100, according to various aspects of the subject disclosure. As illustrated, the well system 100 includes a wellhead 106 arranged at the Earth's surface 150 and a wellbore 102 that extends from the wellhead 106 and penetrates a subterranean earth formation 104. Even though FIG. 1 depicts a land-based wellhead, the embodiments of the present disclosure are equally well suited for use by other types of surface installations or rigs, such as offshore platforms, land-based rigs, or rigs used in any other geographical location.

In various scenarios, a work string (not shown) may be disposed in wellbore 102. As used herein, the term "work string" refers to one or more types of connected lengths of tubulars or pipe, such as drill pipe, drill string, landing string, production tubing, coiled tubing, combinations thereof, or the like. A work string may be used to stimulate (i.e., hydraulically fracture or "frack") portions of the wellbore 102 or the work string may be entirely omitted and wellbore 102 may nonetheless be stimulated using the systems and methods described herein.

As illustrated, the wellbore 102 extends vertically away from the surface 150. In many well systems, a branch or lateral wellbore may also extend laterally from the wellbore 102. Alternatively, the wellbore 102 itself may deviate from vertical to form a lateral wellbore across a deviated or horizontal portion thereof. Although not explicitly shown, in various scenarios, wellbore 102 may be at least partially lined with a casing string or may otherwise remain at least partially uncased.

During fluid pumping operations, in one example, a work string may be coupled to a completion assembly extended into and deployed in wellbore 102 using one or more packers. Packers may seal an annulus defined between the completion assembly and the inner wall of wellbore 102 and thereby effectively divide subterranean formation 104 into multiple production intervals or pay zones. Each interval may be independently or simultaneously stimulated (e.g., hydraulically fractured or "fracked") using the systems and methods described herein.

In the completion assembly example, a sliding sleeve assembly may be arranged within the work string at each interval, each sliding sleeve assembly axially movable within the work string to expose or occlude one or more ports defined therein. Once exposed, the ports may facilitate fluid communication into the annulus from the interior of the work string such that hydraulic fracturing operations may be undertaken in each corresponding interval.

In other embodiments, however, the completion assembly may be omitted from the well system 100 and wellbore 102 may instead be lined with casing and perforated in strategic locations to facilitate fluid communication between the interior of the casing and each corresponding interval. In such embodiments, wellbore 102 may nonetheless be stimulated using the systems and methods described herein by hydraulically fracturing the formation 104 via the perforations.

To facilitate hydraulic fracturing of the formation 104, the system 100 may also include a fracturing controller 111. Controller 111 communicates with a work string or a casing string so that a prepared fracturing fluid 103 can be pumped to wellhead 106 via surface conduits 110, down wellbore 102, and out through one or more ports or perforations (as indicated by arrows 105) into selected intervals to fracture the formation 104 adjacent the corresponding intervals. As illustrated, fracturing controller 111 includes pump control circuitry 113 for operating one or more pumps 108 to pump fluid 103 into the wellbore. Controller 111 also includes mixing control circuitry 115 and overpressure mitigation circuitry 117.

In some scenarios, as illustrated, the controller 111 may be arranged at the surface 150 adjacent the wellhead 106. In other scenarios, however, controller 111 may be remotely located and able to communicate with the systems 109 and pumps 108 via wired or wireless telecommunications.

Mixing control circuitry 115 controls the relative concentrations of fluids and other substances such as proppant that are combined from materials systems 109 (e.g., a fluid system and a proppant system) to form fluid 103. For example, mixing control circuitry 115 may operate materials system 109 to mix and dispense fracturing fluid 103 having desired fluid properties (e.g., viscosity, density, fluid quality, etc.). Materials system 109 may include a blender and sources of known substances that are combined in the blender to produce fracturing fluid 103.

Materials systems 109 may also include proppant contained in one or more proppant storage devices, and a transfer apparatus that conveys the proppant from the storage device(s) to the fluid system for blending.

Pumps 108 receive the prepared fracturing fluid from materials system 109 and may include a series of positive displacement pumps (referred to as fracturing or "frac" pumps) that inject fracturing fluid 103 into the wellbore 102 under specified pressures and at predetermined flow rates. Operation of pumps 108 is controlled by pump control circuitry 113 and/or overpressure mitigation circuitry 117.

Controller 111 includes hardware and software (e.g., a programmed computer) that allow a well operator to manually or autonomously control materials system 109 and pumps 108. Data from the fracturing operation, including real-time data from one or more sensors such as surface pressure sensor 116 and/or downhole pressure sensor 118 in wellbore 102, from pumps 108, and/or from materials system 109 is received and processed by controller 111. In response to this real-time data, controller 111 provides control (command) signals to the materials system 109 and pumps 108.

In some cases, well system 100 may include a relief valve 112 on the surface between pumps 108 and wellhead 106 to protect the wellhead and downhole equipment from overpressure damage. In these examples, check valve 114 is provided between surface relief valve 112 and wellhead 106. If relief valve 112 opens, check valve 114 immediately seats and traps a fluid-hammer wave between check valve 114 and wellbore 102. Because of potential well control issues, the relief valve should not be placed between the check valve and wellhead. However, even with overpressure safety equipment such as relief valve 112 and check valve 114, if a flow stoppage occurs down hole, the maximum pressure down hole will have already occurred before the pressure rise is observed at the surface (e.g., by a release of relief valve 112 and/or in surface pressure measurements obtained at surface pressure sensor 116). As a result, surface relief equipment such as relief valve 112 and check valve 114, may not provide sufficient protection against a peak fluid-hammer wave pressure down hole.

In order to mitigate or prevent a fluid hammer wave of this type, overpressure mitigation circuitry 117 receives downhole pressure measurements from downhole pressure sensor 118 and determines and monitors a rate of change of the downhole pressure from the received downhole pressure measurements. When the rate of change of the downhole pressure exceeds a rate threshold, overpressure mitigation circuitry 117 may determine that a downhole flow stoppage has occurred and may stop operation of pumps 108 to mitigate or prevent a fluid hammer effect from occurring within fluid 103.

The rate threshold is specific to the well system 100 and may depend on a fluid flow rate of fluid 103, the fluid volume, the proppant concentration in fluid 103, and/or the speed of sound in fluid 103.

Figure 2:
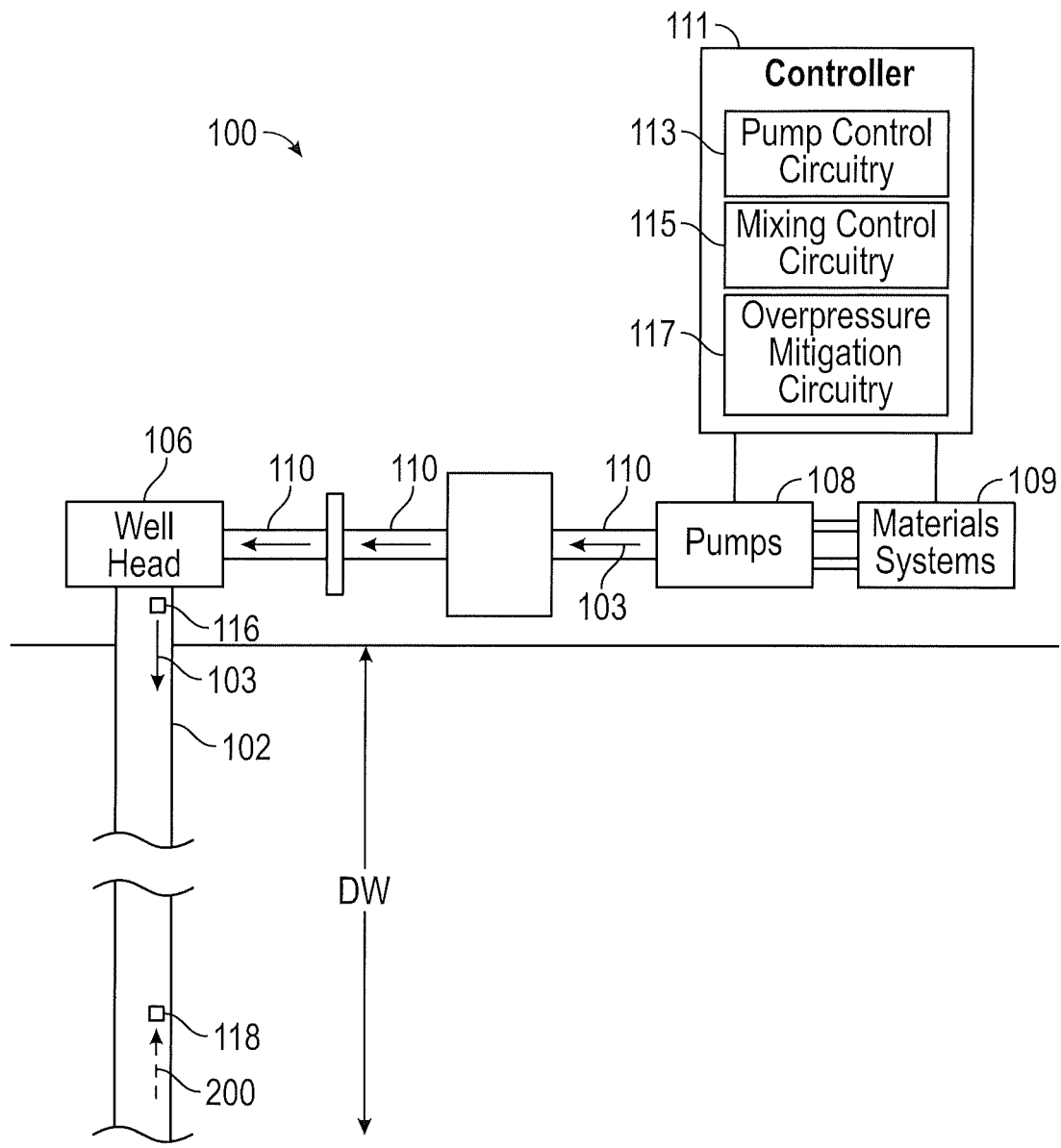
FIG. 2 is a diagram of the system of FIG. 1 in the event of a downhole flow restriction, according to some embodiments of the present disclosure.

FIG. 2 depicts a scenario in which there is a downhole flow stoppage such as from a well screenout, and the kinetic energy of the moving fluid in the well is converted to potential energy (pressure) of a static fluid. If care is not taken, this absorbed kinetic energy becomes a fluid-hammer pressure.

A liquid, although usually considered to be incompressible, is actually slightly compressible. Because a liquid is compressible and has mass, compression waves can occur in fluid 103 if care is not taken, and the fluid can be modeled as a mass and a spring. The following mass-and-spring analogy describes the phenomenon of fluid-hammer pressure in a liquid.

The fluid flowing down the work string in FIG. 2 can be modeled as multiple masses and springs extending down the wellbore. If fluid is being pumped down the work string and then suddenly stops because of downhole flow stoppage as indicated in FIG. 2, the upper mass will push on the lower mass through the middle spring(s).

The push of the upper mass through the middle spring along with the downward push of the lower mass will compress the lower spring. This compression of the spring is equivalent to a rise in bottomhole pressure (BHP) in the well, which, in the systems and methods disclosed herein can be detected using sensor 118. In the scenario of FIG. 2, the downward momentum of the masses will continue to compress the middle and lower springs until they absorb all of the energy of the moving masses. After fully compressing the middle and lower springs, the masses will rebound, and their upward momentum, indicated by arrow 200 in FIG. 2, will cause compression of the upper springs and extension of the lower spring. This will cause a rise of surface tubing pressure and a drop in BHP. This movement of the springs and masses can be said to constitute the "fluid-hammer wave", indicated by arrows 300 of FIG. 3.

Figure 3:
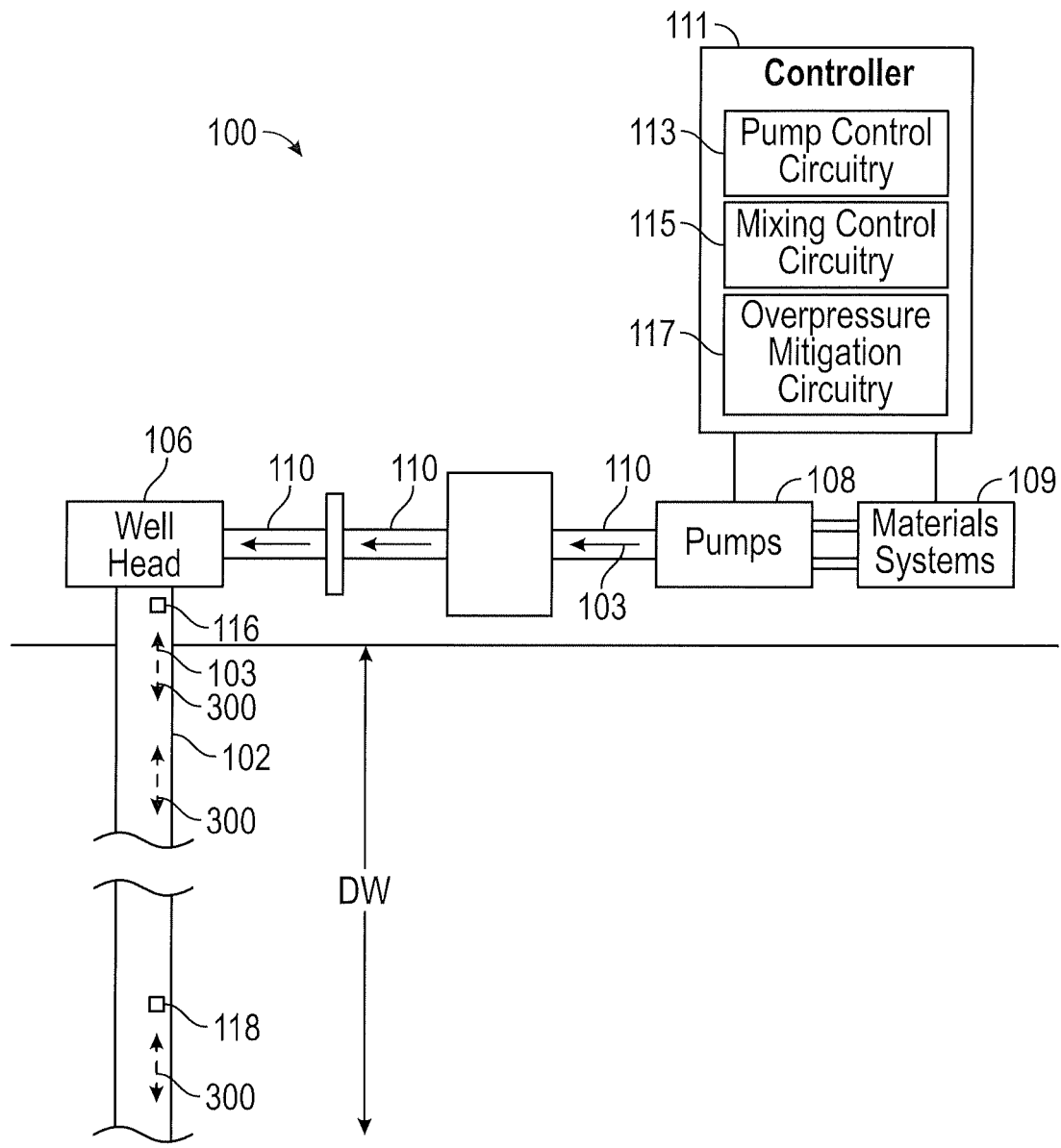
FIG. 3 is a diagram of the system of FIG. 2 illustrating a fluid hammer effect caused the downhole flow restriction, according to some embodiments of the present disclosure.

If there were no frictional losses, the springs and masses indicated by arrows 300 of FIG. 3 would continue to oscillate indefinitely. However, in reality, the fluid friction in the work string and leakoff to the formation causes the fluid pressure oscillations of the water-hammer wave to decay.

If the fluid flow into the well were to be stopped at the exact instant that the flow stoppage occurs downhole, then there would be a sudden drop of surface tubing pressure after the flow stoppage. However, in conventional systems (e.g., systems that do not sense downhole pressure and/or that do not generate (e.g., real-time) system-specific rate-of-change thresholds as described herein), during the time that the fluid-hammer pressure is rising downhole, fluid continues to be pumped into the well. The transit time for the fluid-hammer pressure wave to reach the surface depends on the well's depth, DW, as indicated in FIGS. 2 and 3, and the speed of sound in fluid 103. Therefore, the deeper the well, the longer the transit time, and consequently, if fluid flow is not stopped, more fluid will be compressed into the tubing before the fluid-hammer pressure wave reaches the surface. This compressed fluid is the cause of fluid compression pressure. It should be appreciated that, although wellbore 102 is depicted as a purely vertical well with a depth DW, wellbore 102 may include a horizontal portion, in which case DW represents the overall length of the well and not only the depth of the vertical portion.

Immediately after the flow stoppage, the flow rate at the flow stoppage point is zero. If fluid flow is not stopped upon flow stoppage downhole, as fluid continues to compress on the bottom of the well, the point of zero flow rate rises toward the surface. This reduces the average flow rate and resulting friction pressure in the tubulars. This friction pressure can be further reduced by dropping the flow rate into the tubulars. If the surface flow rate is suddenly cut because of the rise in pressure observed at the surface, then there will be some additional reduction in surface pressure. If the reduction in friction pressure and pressure reduction caused by flow stoppage at the surface is occurring faster than the rise in fluid compression pressure, then the first reflected wave after the flow stoppage will not be as severe as possible. As a result, in the scenarios depicted in FIGS. 2 and 3, the second reflected wave can be worse than the first. For this reason, detection of a rise in pressure at the surface (e.g., using only surface pressure sensor 116) may not be sufficient (or sufficiently soon after a stoppage) to mitigate damage to downhole or other equipment.

Accordingly, overpressure mitigation circuitry 117 stops pumping of pumps 108 based on the BHP, and more particularly, based on an increase in the rate of change of the BHP beyond a threshold that is based on the specific properties of the well system 100. The system-specific threshold may be based on a fluid flow rate of fluid 103, the fluid volume, the proppant concentration in fluid 103, and/or the speed of sound in fluid 103 as, for example, described by the derivations included hereinafter.

To solve for the fluid-hammer pressure in a well system, the kinetic energy equation is set equal to the potential energy equation, and then the resulting equation is rearranged to yield the pressure. This is shown in the following equations:

$$KE = \frac{1}{2}\rho L A v^2 \qquad (1)$$

$$PE = \frac{1}{2}\frac{LAfP^2}{\beta_e}. \qquad (2)$$

At a flow stoppage, the kinetic energy is the same as the potential energy, and thus:

$$P = v\sqrt{\frac{\rho\beta_e}{f}}, \qquad (3)$$

where, KE=kinetic energy, PE=potential energy, ρ=absolute fluid density, L=flow length (see, e.g., DW above), A=flow area, υ=fluid velocity, f=liquid fraction of proppant-laden gel, and P=fluid hammer pressure in fluid. The liquid fraction of a proppant-laden gel can be determined using Equation 4 below:

$$f = \frac{\left(\frac{Denb + Avgpc}{1 + Propsv * Avgpc}\right)Propsv - 1}{Denb * Propsv - 1}, \qquad (4)$$

where, Denb=density of a base gel, Avgpc=average proppant concentration, Propsv=proppant specific volume, and βe=effective bulk modulus of the pipe and the fluid.

From Equation (3) for water-hammer pressure above, it can be observed that the higher the velocity, density, and bulk modulus of the fluid, the higher the pressure wave will be when the fluid is suddenly stopped. A lower volume fraction of liquid also increases this final pressure. Because only the velocity is outside the square root, the velocity will have the greatest impact on the pressure.

The basic equation used to calculate the fluid-compression pressure is the equation defining the bulk modulus, $$\beta = \frac{\Delta P * V * f}{\Delta V}, \qquad (5)$$

where β=bulk modulus, ΔP=compressional pressure, V=volume of fluid, and ΔV=change in volume (how much additional fluid is pumped into a closed system).

Rearranging this equation allows for the calculation of the compressional pressure and provides Equation 6 which shows the change in pressure:

$$\Delta P = \frac{\Delta V * \beta}{V * f}. \qquad (6)$$

An effective bulk modulus can be calculated from the bulk modulus of the fluid and the bulk modulus of the tubing or casing. The following equations (7) and (8) are used to combine these:

$$\beta e = \frac{1}{\frac{1}{\beta p} + \frac{1}{\beta f}} \quad (7)$$

$$\beta p = \frac{TE}{D}, \quad (8)$$

where $\beta p$=bulk modulus of tubing or casing, T=wall thickness, E=steel modulus of elasticity (e.g., =30,000,000 psi), D=ID of tubing or casing, $\beta f$=bulk modulus of fluid (e.g., =300,000 to 400,000 psi).

Graphical techniques and a fluid-hammer calculator based on the equations above, can be both used to predict the surface pressure peaks resulting from a fluid hammer caused by a flow stoppage. According to these predictions, the first surface pressure peak should be the largest peak, the following peaks decaying in magnitude due to leakoff into the formation. However, it has been discovered that, perhaps due to a sudden drop in friction pressure in the fluid and/or a non-instantaneous flow stoppage, the first peak is often not the largest peak.

Because of the length of the well, several seconds of pumping can therefore continue after a downhole flow stoppage before a surface pressure sensor such as sensor 116 of FIG. 1 can detect the flow stoppage. This continued pumping can keep the flow rate high which, as noted above in connection with Eq. (3) can result in a higher fluid-hammer pressure than would have occurred if the pumping had been stopped at the time of the flow stoppage.

Accordingly, the downhole pressure measurements provided by downhole pressure sensor 118 can be helpful in identifying the flow stoppage closer to the time at which the flow stoppage occurs. However, it can be difficult to identify a flow stoppage from pressure changes alone as the downhole pressure fluctuates even in the absence of a flow stoppage.

Advantageously, it has also been discovered that, based on the fluid-hammer equations above and corroborated by field data, a signature of a flow stoppage for each particular well system can be identified in the rate of change of the downhole pressure. Accordingly, a rate of change threshold for the downhole pressure can be identified for each well system at any given time. In particular, overpressure mitigation circuitry 117 uses downhole pressure sensor 118 to monitor the rate of change of the downhole pressure and compare the monitored rate of change with the determined threshold for that well system at that time.

For example, as soon as a rate of change of downhole pressure that is monitored by overpressure mitigation circuitry 117 approaches the rate-of-change threshold of a fluid hammer compressional pressure rise (e.g., a rate-of-change of pressure threshold as defined by $\Delta P$ in Eq. 6 above based on the fluid flowrate ($\upsilon$), fluid volume (V), proppant concentration (Avgpc), and/or speed of sound in the fluid), overpressure mitigation circuitry 117 immediately shuts down the surface pumps (e.g., pumps 108). Since the compressional pressure would not be offsetting the friction pressure, the peak surface pressure would be reduced by the difference between the friction pressure and any compressional pressure occurring before the pumps can be shut down. This will reduce both the downhole and surface peak pressures by stopping the pumps from continuing to pump at the surface after the flow stoppage has already occurred downhole.

The speed of sound in the fluid can be determined while pumping by transforming (e.g., using a Fourier transform such as a fast Fourier transform (FFT) operation) on the surface or downhole pressure measurements and determining the time to reflect from surface to a downhole reflector at a known depth such as the rathole (if no tools are in the hole) or to a tool or sand plug in the hole.

Figure 4:
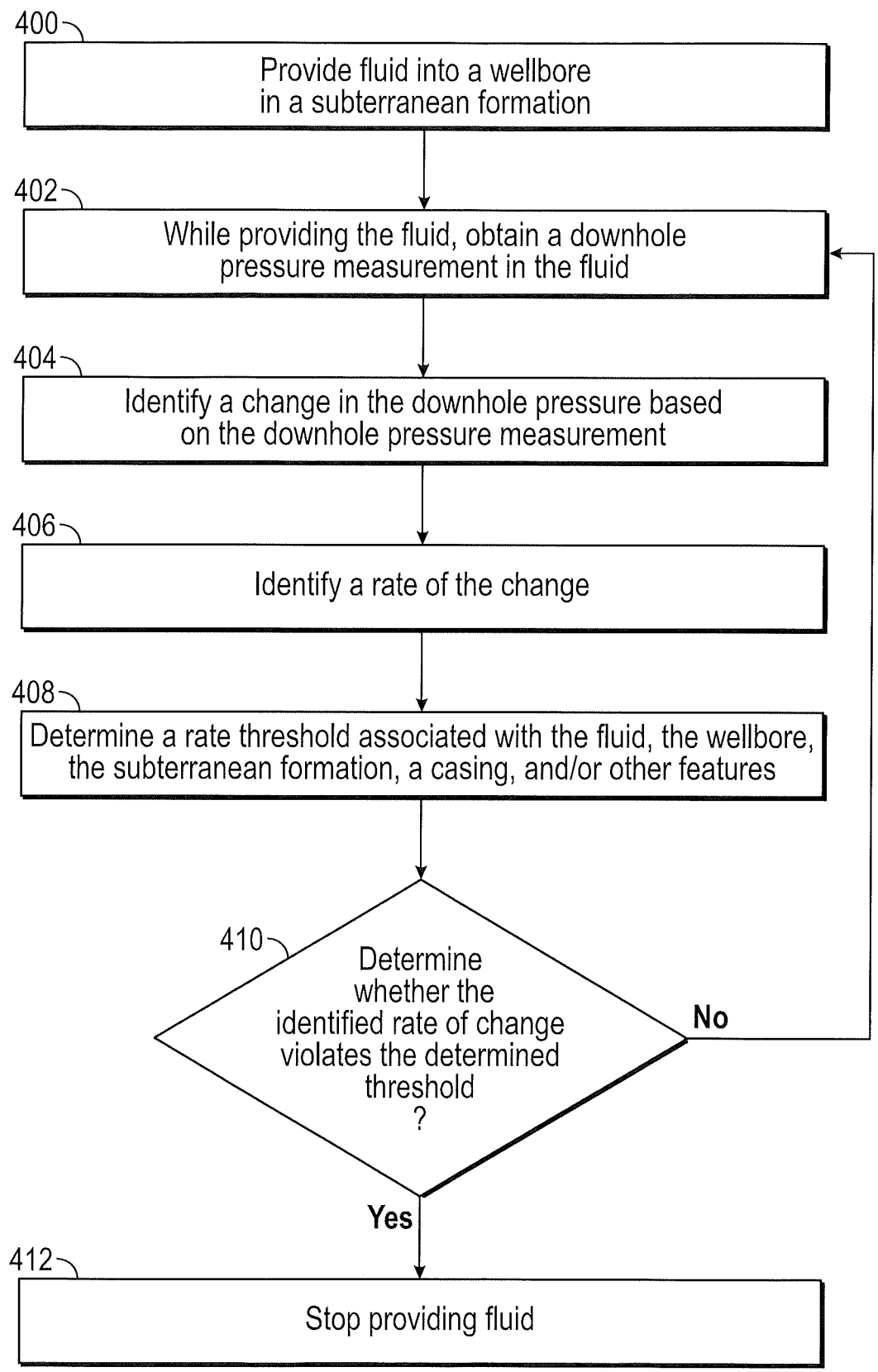
FIG. 4 is a flow diagram for overpressure mitigation for the system of FIG. 1, according to some embodiments of the present disclosure.

FIG. 4 depicts a flow diagram of an example process for overpressure mitigation in a well system such as well system 100 of FIG. 1, according to aspects of the subject technology. For explanatory purposes, the example process of FIG. 4 is described herein with reference to the components of FIGS. 1-3. Further for explanatory purposes, the blocks of the example process of FIG. 4 are described herein as occurring in series, or linearly. However, multiple blocks of the example process of FIG. 4 may occur in parallel. In addition, the blocks of the example process of FIG. 4 need not be performed in the order shown and/or one or more of the blocks of the example process of FIG. 4 need not be performed.

In the depicted example flow diagram, at block 400, fluid such as fracking fluid is provided (e.g., pumped, using pumps 108) into a wellbore such as wellbore 102 in a subterranean formation such as formation 104.

At block 402, while providing the fluid, one or more downhole pressure measurements representing the downhole pressure in the fluid are obtained (e.g., using pressure sensor 118).

At block 404, a change in the downhole pressure is identified (e.g., by overpressure mitigation circuitry 117) based on the downhole pressure measurement(s).

At block 406, a rate of the change is identified (e.g., by overpressure mitigation circuitry 117).

At block 408, a rate threshold associated with the fluid, the wellbore, the subterranean formation, a casing, and/or other features of the well system is determined (e.g., by overpressure mitigation circuitry 117). As described herein, the threshold is based on a flow rate of the fluid, the fluid volume, the proppant concentration in the fluid, and/or the speed of sound in the fluid. Determining the rate threshold may include determining the speed of sound in the fluid. Because each well system, including the fluid at any given time during fluid pumping, is unique, determining the speed of sound may include experimentally determining the speed of sound in the fluid during pumping. For example, samples of pressure measurements from a surface pressure sensor and/or a downhole pressure sensors may be frequency transformed (e.g., using a Fourier transform such as a fast Fourier transform). The frequency transformed measurements will have features corresponding to pressure wave reflections from downhole objects such as the rathole, if no tools are in the hole, or to a tool or sand plug in the hole. Using known distances to one or more of the downhole objects and using the frequency features in the transformed data that correspond to those downhole features, the speed of sound is determined.

At block 410, the system (e.g., overpressure mitigation circuitry 117) determines whether the identified rate of change violates (e.g., exceeds) the determined threshold.

At block 412, if it is determined that the rate of change of the downhole pressure violates (e.g., exceeds) the determined threshold, the system stops providing the fluid into the wellbore (e.g., by stopping operation of pumps 108). In this way, fluid-hammer effects in the system can be reduced and/or avoided altogether by stopping the fluid flow at the same time as a downhole flow stoppage occurs, thereby helping to prevent damage to the wellhead, downhole tools, and/or other components of a well system. As indicated, if it is determined that the rate of change of the downhole pressure does not violate the determined threshold, the overpressure mitigation circuitry continues to obtain and monitor downhole pressure measurements as described in blocks 402-410.

Various aspects described herein are directed to computer control for the controller 111 (e.g., overpressure mitigation circuitry 117) and can use various blocks, modules, elements, components, methods, and algorithms that can be implemented using computer hardware, software, combinations thereof, and the like. To illustrate this interchangeability of hardware and software, various illustrative modules, elements, components, methods and algorithms have been described generally in terms of their functionality. Whether such functionality is implemented as hardware or software will depend upon the particular application and any imposed design constraints. For at least this reason, it is to be recognized that one of ordinary skill in the art can implement the described functionality in a variety of ways for a particular application. Further, various components and blocks can be arranged in a different order or partitioned differently, for example, without departing from the scope of the embodiments expressly described.

Computer hardware used to implement the various illustrative blocks, modules, elements, components, methods, and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Various examples of aspects of the disclosure are described below as clauses for convenience. These are provided as examples, and do not limit the subject technology.

Clause A. A method, comprising: pumping a fluid into a wellbore in a subterranean formation; while pumping the fluid, obtaining downhole pressure measurements using a downhole pressure sensor; determining a rate of change of a downhole pressure in the fluid based on the downhole pressure measurements; comparing the rate of change of the downhole pressure with a threshold; and determining whether a downhole flow stoppage has occurred based on the comparison.

Clause B. A well system, comprising: at least one pump configured to provide a fluid into a wellbore in a subterranean formation; a downhole pressure sensor in the wellbore; and a controller communicatively coupled to the downhole pressure sensor and the at least one pump, wherein the controller comprises overpressure mitigation circuitry configured to: obtain downhole pressure measurements using the downhole pressure sensor while the at least one pump provides the fluid into the wellbore; determine a rate of change of a downhole pressure in the fluid based on the downhole pressure measurements; compare the rate of change of the downhole pressure with a threshold; and determine whether a downhole flow stoppage has occurred based on the comparison.

Clause C. A controller for a fracturing fluid pump configured to pump a fracturing fluid into a wellbore in a subterranean formation, the controller comprising overpressure mitigation circuitry configured to: obtain downhole pressure measurements using a downhole pressure sensor in the wellbore while the fracturing fluid pump provides the fluid into the wellbore; determine a rate of change of a downhole pressure in the fluid based on the downhole pressure measurements; compare the rate of change of the downhole pressure with a threshold that is based on a speed of sound in the fracturing fluid; and determine whether a downhole flow stoppage has occurred based on the comparison.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A method of performing operations on a well system, comprising:
    pumping a fluid into a wellbore in a subterranean formation;
    while pumping the fluid, obtaining downhole pressure measurements using a downhole pressure sensor;
    determining a rate of change of a downhole pressure in the fluid based on the downhole pressure measurements;
    comparing the rate of change of the downhole pressure with a threshold, the threshold based on measurements at a surface of the wellbore, in the wellbore, or both during operations; and
    determining whether a downhole flow stoppage has occurred based on the comparison.

2. The method of claim 1, wherein the fluid is a fracturing fluid containing a proppant.

3. The method of claim 1, wherein the threshold is based on a flowrate of the fluid or a volume of the fluid.

4. The method of claim 1, wherein the fluid includes a proppant and wherein the threshold is based on a proppant concentration of the fluid.

5. The method of claim 1, wherein the threshold is based on a speed of sound in the fluid.

6. The method of claim 5, further comprising determining the speed of sound in the fluid while pumping the fluid.

7. The method of claim 6, wherein determining the speed of sound in the fluid comprises performing a Fourier transform of the downhole pressure measurements.

8. The method of claim 6, further comprising obtaining surface pressure measurements using a surface pressure sensor, and wherein determining the speed of sound in the fluid comprises performing a Fourier transform of the surface pressure measurements.

9. The method of claim 1, further comprising determining the threshold, wherein the threshold is specific to the fluid and the wellbore.

10. The method of claim 1, wherein determining whether the downhole flow stoppage has occurred based on the comparison comprises determining that the downhole flow stoppage has occurred based on the comparison, and wherein the method further comprises stopping pumping of the fluid responsive to determining that the downhole flow stoppage has occurred.

11. A well system, comprising:
   at least one pump configured to provide a fluid into a wellbore in a subterranean formation;
   a downhole pressure sensor in the wellbore; and
   a controller communicatively coupled to the downhole pressure sensor and the at least one pump, wherein the controller comprises overpressure mitigation circuitry for performing well system operations and configured to:
      obtain downhole pressure measurements using the downhole pressure sensor while the at least one pump provides the fluid into the wellbore;
      determine a rate of change of a downhole pressure in the fluid based on the downhole pressure measurements;
      compare the rate of change of the downhole pressure with a threshold, the threshold based on measurements at a surface of the wellbore, in the wellbore, or both during well system operations; and
      determine whether a downhole flow stoppage has occurred based on the comparison.

12. The well system of claim 11, wherein the threshold is based on a fluid flowrate of the fluid, a fluid volume of the fluid, a proppant concentration of the fluid, or a speed of sound in the fluid.

13. The well system of claim 12, wherein the overpressure mitigation circuitry is further configured to determine the speed of sound in the fluid while pumping the fluid.

14. The well system of claim 13, wherein the overpressure mitigation circuitry is configured to determine the speed of sound based on a Fourier transform of the downhole pressure measurements.

15. The well system of claim 13, further comprising a surface pressure sensor communicatively coupled to the overpressure mitigation circuitry, wherein the overpressure mitigation circuitry is further configured to:
   obtain surface pressure measurements using the surface pressure sensor; and
   determine the speed of sound in the fluid based on a Fourier transform of surface pressure measurements from the surface pressure sensor.

16. The well system of claim 11, wherein the overpressure mitigation circuitry is further configured to determine the threshold, wherein the threshold is specific to the fluid and the wellbore.

17. The well system of claim 11, wherein the overpressure mitigation circuitry is further configured to stop operation of the at least one pump responsive to determining that the downhole flow stoppage has occurred.

18. A controller for a fracturing fluid pump configured to pump a fracturing fluid into a wellbore in a subterranean formation, the controller comprising overpressure mitigation circuitry configured to:
   obtain downhole pressure measurements using a downhole pressure sensor in the wellbore while the fracturing fluid pump provides the fluid into the wellbore;
   determine a rate of change of a downhole pressure in the fluid based on the downhole pressure measurements;
   compare the rate of change of the downhole pressure with a threshold that is based on a speed of sound in the fracturing fluid; and
   determine whether a downhole flow stoppage has occurred based on the comparison.

19. The controller of claim 18, wherein the overpressure mitigation circuitry is further configured to determine the threshold.

20. The controller of claim 19, wherein the threshold is further based on a flowrate of the fluid, a volume of the fluid, and a proppant concentration of the fluid.

* * * * *